Jan. 31, 1950 M. CAWEIN 2,495,696
SCANNING CURRENT GENERATOR
Filed April 29, 1946
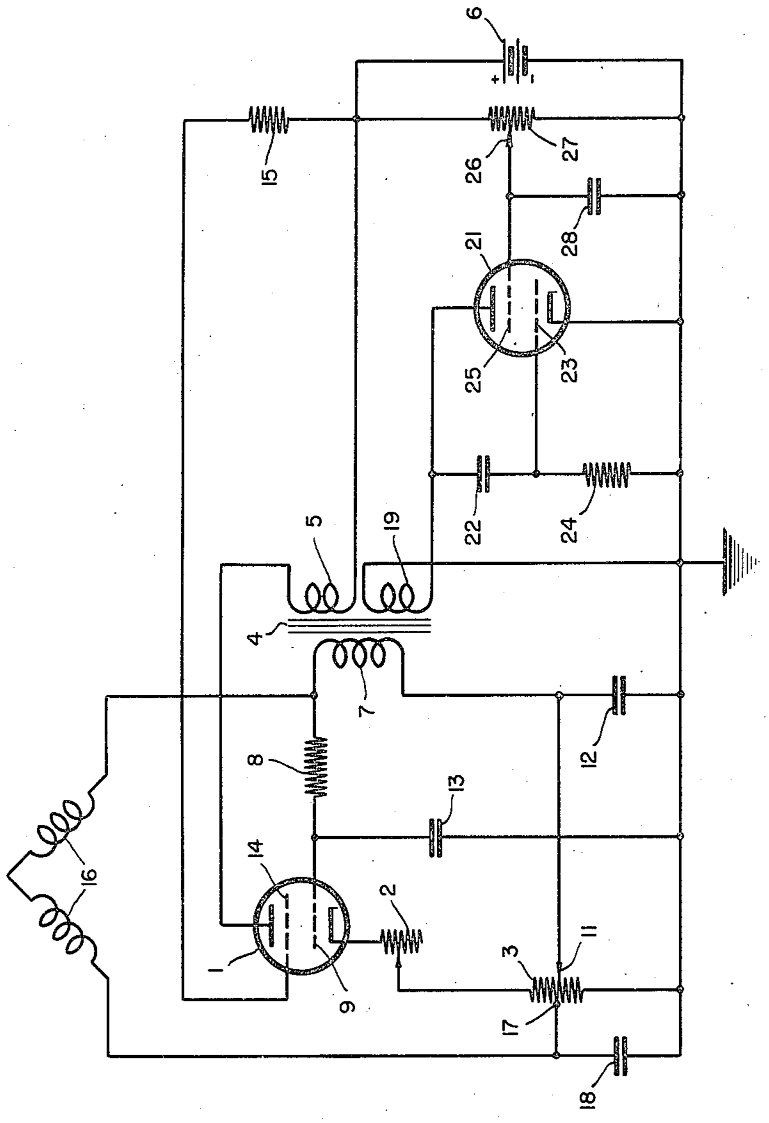
INVENTOR
MADISON CAWEIN
BY [signature]
ATTORNEY Patented Jan. 31, 1950

2,495,696

UNITED STATES PATENT OFFICE 2,495,696

SCANNING CURRENT GENERATOR

Madison Cawein, Fort Wayne, Ind., assignor, by mesne assignments, to Farnsworth Research Corporation, a corporation of Indiana Application April 29, 1946, Serial No. 665,658

7 Claims. (Cl. 250—36)

This invention relates to saw-tooth wave generators and particularly to relaxation oscillators capable of producing saw-tooth current waves for use in conjunction with eletromagnetic deflection systems for cathode ray tubes.

In one form of cathode ray tube used in oscilloscopes, television systems and the like, the electron beam is deflected over a target electrode by means of an electro-magnetic deflection system. A deflection system of this type needs to be energized by a current having a substantially saw-tooth wave form whereby to produce a beam-deflecting field of substantially saw-tooth form. A self-oscillating relaxation wave generator for producing a saw-tooth current wave comprises the subject matter of Patent No. 2,059,683 granted to P. T. Farnsworth on November 3, 1936, for a Scanning oscillator. The Farnsworth oscillator includes a tetrode as the oscillator tube and provides for inductive regenerative coupling between the anode and control grid circuits of the tube. This oscillator is of the R. C. type and includes a condenser-resistor network in the control grid circuit as the frequency determining element.

The Farnsworth oscillator operated satisfactorily to develop a saw-tooth deflection current wave at a frequency of the order of 3,000 cycles which was the customarily used line scanning frequency of early television systems at the time that the Farnsworth oscillator was developed. Additionally, at this time, the cathode ray was required to be deflected only through a relatively narrow angle and approximately 4 kilovolts was used as the second anode potential. Later, when the number of scanning lines for a television picture was increased to 441 and then to 525, the requirements of a scanning current oscillator became greater than the Farnsworth device could satisfactorily meet.

Accordingly, another type of relaxation oscillator was devised in accordance with the subject matter of a copending application of Madison Cawein for a Wave generator which bears Serial No. 471,977, was filed on January 11, 1943, and has since matured into Patent Number 2,440,895. The Cawein oscillator utilizes a beam power tube, or its equivalent, and an inductive regenerative coupling between the anode and control grid circuits. The anode-to-cathode circuit of this device includes a resistive component partly in the form of a resistor connected to the cathode, the internal resistance of the tube and the resistance reflected into this circuit from the coupling device. In contradistinction to the Farnsworth oscillator, the Cawein device is of the L/R type wherein the oscillation frequency is a function of the ratio of the anode-to-cathode inductance to the total effective dynamic resistance of this circuit.

The Cawein oscillator enabled the production of a saw-tooth current wave of considerably greater magnitude than that which it was possible to derive from the Farnsworth apparatus. Nevertheless, to meet the rigorous requirements of a scanning oscillator, the Cawein device had to be operated to the limit of its capacity and the circuit design, in order to achieve this maximum output, was quite critical. The subject matter of the present invention constitutes an improvement upon the Cawein generator. In order to fully understand the nature of this improvement, a thorough comprehension of one of the fundamental characteristics of an L/R oscillator of the Cawein type is necessary.

At the start of a scanning cycle the current through the tube and through the anode-connected inductive coupling element begins to flow. By reason of the regenerative coupling between the anode and the control grid circuits, there is impressed upon the control grid a high positive potential whereby to minimize the impedance of the tube. The anode current flowing through a circuit which includes series inductance and resistance increases exponentially. The steady state value of the current which can flow in such a circuit is dependent upon the total effective resistance of the circuit. The current, therefore, increases in an exponential curve which approaches asymptotically, the maximum value of current that can flow in the circuit. However, as in all exponential curves, only a relatively small portion at the beginning thereof is substantially linear. Consequently, for a relaxation oscillator, the current rise must be restricted to the relatively linear portion of the characteristic curve. At such a point, it is charactertistic of the Cawein oscillator for a current relaxation to begin. Once started, this relaxation is substantially instantaneous. It is apparent that, in order to increase the useful range of a device of this character, the substantially linear portion of the characteristic curve must be extended.

Therefore, it is an object of the present invention to provide a relaxation oscillator capable of producing a saw-tooth current wave wherein the trace interval of the curve is extended.

Another object of the invention is to provide a relaxation oscillator of the L/R type for producing a saw-tooth current wave wherein the effective dynamic resistance of the frequency determining circuit is decreased during trace intervals and is increased during retrace intervals.

In accordance with the present invention, there is provided a relaxation oscillation generator for developing a saw-tooth current wave which includes a vacuum tube having regeneratively coupled input and output circuits by means of which there is developed a substantially linear saw-tooth current wave having a relatively long trace interval and a relatively short retrace interval during each cycle. The character of the oscillation generator is such that the respective trace and retrace portions of the saw-tooth current wave have slopes which depend upon the ratio of the inductance to the resistance of the output circuit which are effective during the respective trace and retrace intervals of each cycle. Additionally, there is provided means coupled to the output circuit of the vacuum tube for reducing the effective resistance of the output circuit during trace intervals so as to extend the linear portion of the saw-tooth current wave during the trace intervals.

More specifically in accordance with the present invention, the oscillation generator vacuum tube is one having at least an anode, a cathode, a control grid and a screen grid. A positive potential is impressed upon the screen grid preferably through an impedance device so that a positive impulsive voltage may be developed and impressed upon the screen grid during retrace intervals. There also is connected in series with the cathode an impedance device such as a resistor which may be employed to vary the oscillation frequency. The anode-to-cathode external circuit includes the primary winding of a coupling transformer. The free oscillation frequency of the device is determined by the ratio of the inductance in the anode-to-cathode circuit represented principally by the primary winding to the total effective dynamic resistance of this circuit which includes the resistance of the tube, the cathode connected resistor and the resistance of the primary transformer winding. A secondary winding of the transformer is connected in a regenerative polarity to the control grid of the tube. Further, in accordance with the present invention, the transformer includes a tertiary winding which is connected between the anode and cathode of an auxiliary vacuum tube which, in addition, is provided with a control grid. The current induced in the tertiary winding of the transformer is of such polarity to flow in the space discharge path of the auxiliary tube. The voltage produced across the terminals of the tertiary winding is impressed upon the control grid of the auxiliary tube to render it conductive during trace intervals and nonconductive during retrace intervals. The tertiary winding then is effective to reflect a resistance component into the anode-to-cathode circuit of the oscillator tube of such a character that the effective dynamic resistance of the oscillator frequency-determining circuit is reduced during trace intervals and is increased during retrace intervals.

For a better understanding of the invention, together with other and further objects thereof, reference is made to the following description, taken in connection with the accompanying drawing, and its scope will be pointed out in the appended claims.

In the accompanying drawing, the single figure is a schematic circuit diagram of apparatus embodying the invention in one form.

Referring now to the drawing, the relaxation oscillator includes an oscillator vacuum tube 1 which in the present instance is a tetrode such as an RCA type 807. The cathode of this tube is connected through a potentiometer 2 and a tapped resistor 3 to ground. There also is provided a coupling transformer 4. The primary winding 5 of this transformer is connected between the anode of the tube 1 and the positive terminal of a source of direct current such as a battery 6, the negative terminal of which is connected to ground. One terminal of a secondary transformer winding 7 is connected through a current limiting resistor 8 to the control grid 9 of the oscillator tube. The other terminal of the secondary winding is connected to a variable tap 11 on the resistor 3. A by-pass condenser 12 also is connected between this terminal of the secondary winding and ground. Another by-pass condenser 13 is connected between the control grid of the oscillator tube and ground. The screen grid 14 of the oscillator tube is connected through a voltage dropping resistor 15 to the positive terminal of the battery 6.

The saw-tooth current wave produced by this oscillator is impressed upon the deflection coils 16 of a cathode ray tube (not shown). This is effected by connecting one terminal of the deflection coils to the control grid-coupled terminal of the transformer secondary winding 7 and the other terminal of these coils to a fixed tap 17 on the resistor 3. A by-pass condenser 18 is connected between the fixed tap 17 and ground. The apparatus so far described is a relaxation oscillator, according to the copending Cawein application referred to, which is capable of generating a substantially linear saw-tooth current wave.

In accordance with a feature of the present invention the coupling transformer 4 is provided with a tertiary winding 19. In addition, there is provided an auxiliary vacuum tube 21 which may be a tetrode as shown such as an RCA type 807. The anode of this tube is connected to one terminal of the tertiary winding. The other terminal of this winding and the cathode of the tube 21 are connected directly to ground. The anode-connected terminal of the tertiary winding is capacitively coupled by means of a condenser 22 to the control grid 23 of the auxiliary tube. A resistor 24 provides a relatively high resistance leak circuit to ground for the coupling condenser 22. The screen grid 25 of the auxiliary tube is connected to a sliding contact 26 on a potentiometer 27 which is connected across the battery 6 as shown. A by-pass condenser 28 is connected between the screen grid of the auxiliary tube and ground.

Referring now to the operation of the apparatus embodying the invention, reference will be made first to the operation of the relaxation oscillator omitting for the moment consideration of the operation of the tertiary winding 19 of the coupling transformer and the apparatus associated therewith. At the beginning of a trace interval of a scanning cycle, current flows in the anode circuit of the oscillator tube 1. This current traverses the primary winding 5 of the coupling transformer and also the cathode connected resistors 2 and 3. The anode circuit thus is seen to comprise a series connection of an inductive component and a resistance element. The resistance element of this circuit includes not only the resistors 2 and 3, but also the internal resistance of the tube 1 and the resistance of the primary winding 5. By reason of the inclusion of this circuit of the inductive primary winding, the current increases in magnitude in the anode circuit according to an exponential function in a well-known manner. The primary and secondary windings 5 and 7 respectively, of the coupling transformer are so polarized that an increase in the magnitude of the current flowing in the primary winding induces in the secondary winding a positive voltage for impression upon the control grid 9. The ratio of turns of these two windings is such that the magnitude of this positive voltage is sufficient to effect a current flow in the control grid circuit. Thus, the internal impedance of the tube 1 is reduced to a minimum during the trace interval of the scanning cycle.

Current continues to flow in the anode circuit of the tube 1 increasing substantially at a linear rate until a point is reached at which a relaxation occurs. The precise reason for the initiation of the current relaxation is not known at present. However, it is believed that it may be caused by some slight change in the potential of one or more of the tube electrodes. Any such change would be magnified many times by the feedback circuit with which the oscillator is provided. In any case, as soon as the current in the anode circuit of the tube begins to decrease in magnitude, there is developed in the secondary winding 7 of the coupling transformer a negative impulsive voltage of considerable magnitude which is impressed upon the control grid 9. In this manner the internal impedance of the tube 1 is increased to a practically infinite magnitude. Thus, it is seen that during the trace portion of the cycle, the dynamic resistance of the anode circuit is relatively low in magnitude and during retrace, this resistance is relatively high. It can be considered, therefore, that the saw-tooth current wave which is generated results from an alternate shifting or oscillation in the magnitude of the dynamic resistance of the anode circuit between two widely differing constant values.

Inasmuch as the current which flows in the anode circuit of the oscillator tube 1 must traverse an inductive element, the rate at which the current increases during trace intervals and decreases during retrace intervals of the cycle may be represented as an exponential curve. During the beginning of a trace interval, a shape of this curve is substantially linear and has a slope which is determined by the time constant of the circuit. The time constant is the ratio of the inductance to the dynamic resistance of this circuit. The greater this time constant or ratio can be made, the steeper will be the slope of the curve and the longer will be the substantially linear portion thereof. The ratio may be increased either by increasing the magnitude of the inductive component or by decreasing the magnitude of the resistive component. However, for any given tube and a particular set of circuit and operating requirements, there are practical limiting values for each of these components. In accordance with a feature of the present invention there is provided a means for effectively reducing the value of the dynamic resistance of the anode circuit during trace intervals and for increasing this resistance during retrace intervals of each scanning cycle.

This is accomplished by providing the tertiary winding 19 on the coupling transformer 4 together with the auxiliary tube 21 for controlling the effectiveness of the tertiary winding. While the current is increasing in the primary winding 5 during trace intervals there is induced thereby into the tertiary winding a substantially constant voltage. The tertiary winding 19 is polarized with respect to the primary winding in such a manner that the constant voltage induced therein is of positive polarity relative to ground and is impressed upon the anode of the tube 21. This positive voltage also is coupled by the condenser 22 to the control grid 23 whereby to render this tube conducting. In this manner the induced current flowing through the tertiary winding also flows through the tube 21.

During a current relaxation in the primary winding occurring in retrace intervals, there is induced in the tertiary winding 19 an impulsive negative voltage of considerable magnitude. This negative voltage is impressed upon both the anode and control grid 23 of the auxiliary tube, thereby rendering this tube nonconductive.

During conductive periods of the tube 21, the flow of current in the tertiary winding 19 is in such a direction to reflect a resistance into the anode circuit of the oscillator tube 1 which has the effect of connecting a resistance element in parallel with the resistance elements of the anode circuit of the oscillator tube. In this manner the effective dynamic resistance of the oscillator anode circuit is reduced considerably during trace intervals of each cycle. Also during retrace intervals when no current is flowing in the tertiary winding 19, there is no effective shunting resistance reflected into the oscillator anode circuit. It may be seen, therefore, that in accordance with the present invention, the time constant of the oscillator anode circuit is appreciably increased during trace intervals and is not materially changed from normal during retrace intervals. As previously explained, by providing the oscillator anode circuit with a greater time constant during trace intervals, the current increases in this circuit in a substantially linear manner for a longer time and reaches a considerably greater magnitude before a current relaxation occurs. The usefulness of a saw-tooth current generator thereby may be considerably extended by the employment of apparatus in accordance with this invention.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A relaxation oscillation generator for developing a saw-tooth current wave comprising, a vacuum tube having input and output circuits, means including an inductance device in said output circuit for effecting a regenerative feedback from said output circuit to said input circuit, whereby to develop a substantially linear saw-tooth current wave having a relatively long trace interval and a relatively short retrace interval during each cycle, the respective trace and retrace portions of said saw-tooth current wave having slopes depending upon the ratio of the inductance to the resistance of said oscillator tube output circuit effective during the respective trace and retrace intervals of each cycle, an auxiliary inductance device coupled to said output circuit inductance device, and means coupled to said auxiliary inductance device to effect a current flow therethrough during trace intervals of said saw-tooth current wave and to interrupt said current flow during retrace intervals of said saw-tooth current wave, thereby effectively reducing the resistance in said oscillator tube output circuit during trace intervals so as to extend the linear portion of said saw-tooth current wave during trace intervals.

2. A relaxation oscillation generator for developing a saw-tooth current wave comprising, a vacuum tube having input and output circuits, inductive coupling means for effecting a regenerative voltage feedback from said output circuit to said input circuit, whereby to develop a substantially linear saw-tooth current wave having a relatively long trace interval and a relatively short retrace interval during each cycle, the respective trace and retrace portions of said saw-tooth current wave having slopes depending upon the ratio of the inductance to the resistance of said oscillator tube output circuit effective during the respective trace and retrace intervals of each cycle, a coil inductively related to said coupling means, and means including an auxiliary vacuum tube coupled to said coil to effect a current flow through said coil during trace intervals of said saw-tooth current wave and to interrupt said current flow during retrace intervals of said saw-tooth current wave, thereby effectively reducing the resistance in said oscillator tube output circuit during trace intervals so as to extend the linear portion of said saw-tooth current wave during trace intervals.

3. A relaxation oscillation generator for developing a saw-tooth current wave comprising, a vacuum tube having input and output circuits, means including a transformer winding to regeneratively couple said input and output circuits, whereby to develop a substantially linear saw-tooth current wave having a relatively long trace interval and a relatively short retrace interval during each cycle, the respective trace and retrace portions of said saw-tooth current wave having slopes depending upon the ratio of the inductance of said transformer winding to the total dynamic resistance of said output circuit effective during the respective trace and retrace intervals of each cycle, an auxiliary winding on said transformer, an auxiliary vacuum tube having an output circuit coupled to said auxiliary transformer winding to effect a current flow through said auxiliary winding during trace intervals of said saw-tooth current wave, thereby reducing the effective dynamic resistance in the output circuit of said oscillator tube so as to extend the linear portion of said saw-tooth current wave during trace intervals, and means including said auxiliary tube to prevent a current flow in said auxiliary transformer winding during retrace periods of said current wave.

4. A relaxation oscillation generator for developing a saw-tooth current wave comprising, a vacuum tube having an anode, a cathode, a control grid and a screen grid, means for impressing a positive potential upon said screen grid, means including a transformer to regeneratively couple said anode and said control grid circuits, whereby to develop a substantially linear saw-tooth current wave having a relatively long trace interval and a relatively short retrace interval during each cycle, the respective trace and retrace portions of said saw-tooth current wave having slopes depending upon the ratio of the inductance to the total dynamic resistance of the anode circuit of said oscillator tube effective during the respective trace and retrace intervals of each cycle, an auxiliary winding on said transformer, an auxiliary vacuum tube having an anode and a cathode coupled to said auxiliary transformer winding in a polarity to effect a current flow through said tube and said auxiliary winding during trace intervals of said saw-tooth current wave, thereby reducing the effective dynamic resistance in the anode circuit of said oscillator tube so as to extend the linear portion of said saw-tooth current wave during trace intervals, and means including said auxiliary transformer winding to render said auxiliary tube nonconductive during retrace periods of said current wave.

5. A relaxation oscillation generator for developing a saw-tooth current wave comprising, a vacuum tube having an anode, a cathode, a control grid and a screen grid, means for impressing a positive potential upon said screen grid, a transformer having primary, secondary and tertiary windings, said primary winding being connected in circuit with the anode of said oscillator vacuum tube, said secondary winding being coupled to the control grid of said oscillator vacuum tube and poled with respect to said primary winding to regeneratively couple said anode and said control grid circuits, whereby to develop a substantially linear saw-tooth current wave having a relatively long trace interval and a relatively short retrace interval during each cycle, the respective trace and retrace portions of said saw-tooth current wave having slopes depending upon the ratio of the inductance to the total dynamic resistance of the anode circuit of said oscillator tube effective during the respective trace and retrace intervals of each cycle, an auxiliary vacuum tube having an anode, a cathode and a control grid, the anode of said auxiliary tube being coupled to said tertiary transformer winding in a polarity tending to effect a current flow through said tube and said tertiary winding during trace intervals of said saw-tooth current wave, thereby reducing the effective dynamic resistance in the anode circuit of said oscillator tube so as to extend the linear portion of said saw-tooth current wave during trace intervals, and a coupling between said tertiary transformer winding and the control grid of said auxiliary vacuum tube to impress potentials upon said auxiliary tube control grid adapted to render said auxiliary tube conductive during trace intervals of said saw-tooth current wave and to render said auxiliary tube nonconductive during retrace intervals of said current wave.

6. A relaxation oscillation generator for developing a saw-tooth current wave comprising, a vacuum tube having an anode, a cathode, a control grid and a screen grid, means including an impedance device for impressing a positive potential upon said screen grid, a transformer having primary, secondary and tertiary windings, said primary winding being connected in circuit with the anode and the cathode of said oscillator vacuum tube, said secondary winding being coupled between the control grid and the cathode of said oscillator vacuum tube and poled with respect to said primary winding to regeneratively couple said anode and said control grid circuits, whereby to develop a substantially linear saw-tooth current wave having a relatively long trace interval and a relatively short retrace interval during each cycle, the respective trace and retrace portions of said saw-tooth current wave having slopes depending upon the ratio of the inductance to the total dynamic resistance of the anode-to-cathode circuit of said oscillator tube effective during the respective trace and retrace intervals of each cycle, an auxiliary vacuum tube having an anode, a cathode and a control grid, the anode of said auxiliary tube being coupled to said tertiary transformer winding in a polarity tending to effect a current flow through said tube and said tertiary winding during trace intervals of said saw-tooth current wave, thereby reducing the effective dynamic resistance in the anode-to-cathode circuit of said oscillator tube so as to extend the linear portion of said saw-tooth current wave during trace intervals, and a coupling between the anode-coupled terminal of said tertiary transformer winding and the control grid of said auxiliary vacuum tube to impress a first potential upon said auxiliary tube control grid adapted to render said auxiliary tube conductive during trace intervals o said saw-tooth current wave and to impress an impulsive second potential upon said auxiliary tube control grid adapted to render said auxiliary tube nonconductive during retrace intervals of said current wave.

7. A relaxation oscillation generator for developing a saw-tooth current wave comprising, a vacuum tube having an anode, a cathode, a control grid and a screen grid, means including a resistor for impressing a positive potential upon said screen grid, a resistor connected to said cathode, a transformer having primary, secondary and tertiary windings, said primary winding being connected in circuit with the anode and the cathode of said oscillator vacuum tube, said secondary winding being coupled between the control grid and the cathode of said oscillator vacuum tube and poled with respect to said primary winding to regeneratively couple said anode and said control grid circuits, whereby to develop a substantially linear saw-tooth current wave in said cathode resistor having a relatively long trace interval and a relatively short retrace interval during each cycle, the respective trace and retrace portions of said saw-tooth current wave having slopes depending upon the ratio of the inductance to the total dynamic resistance of the anode-to-cathode circuit of said oscillator tube effective during the respective trace and retrace intervals of each cycle, an auxiliary vacuum tube having an anode, a cathode and a control grid, the anode and cathode of said auxiliary tube being connected to terminals of said tertiary transformer winding in a polartiy tending to effect a current flow through said tube and said tertiary winding during trace intervals of said saw-tooth current wave, thereby reducing the effective dynamic resistance in the anode-to-cathode circuit of said oscillator tube so as to extend the linear portion of said saw-tooth current wave during trace intervals, and a resistive-capacitive coupling between the anode-connected terminal of said tertiary transformer winding and the control grid of said auxiliary vacuum tube to impress a positive potential upon said auxiliary tube control grid and thereby to render said auxiliary tube conductive during trace intervals of said saw-tooth current wave and to impress an impulsive negative potential upon said auxiliary tube control grid and thereby to render said auxiliary tube nonconductive during retrace intervals of said current wave.

MADISON CAWEIN.

REFERENCES CITED

The following references are of record in the file of this patent:

UNITED STATES PATENTS

| Number | Name | Date |
|---|---|---|
| 1,539,402 | Nichols | May 26, 1925 |